FIP8102 OR 3,492,579
Jan. 27, 1970 F. CARASSA 3,492,579
FM SYSTEM WITH PILOT SIGNAL TO MEASURE GROUP DELAY
Filed Nov. 27, 1967
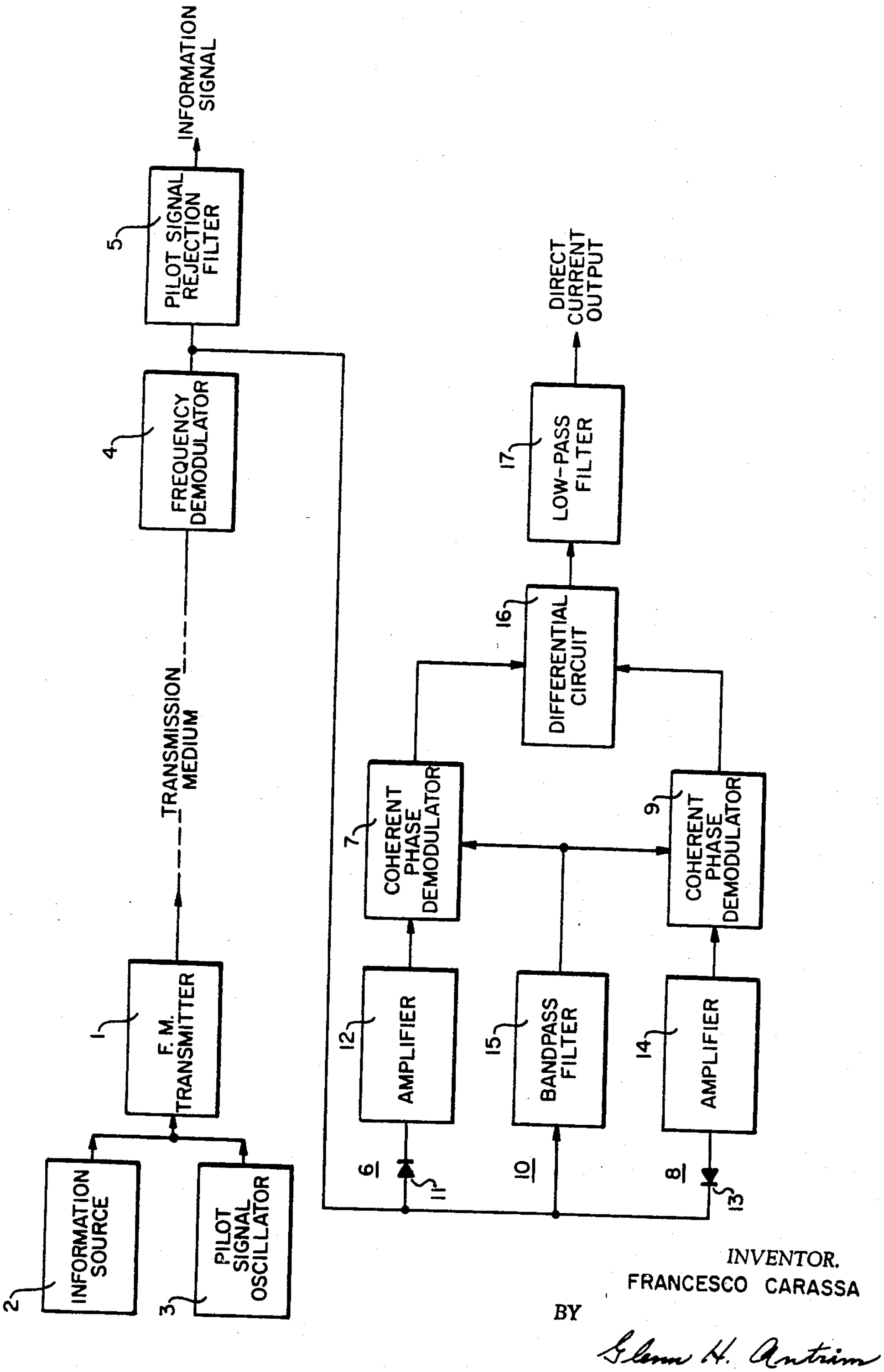
INVENTOR.
FRANCESCO CARASSA
BY
Glenn H. Antrim
ATTY.

3,492,579

FM SYSTEM WITH PILOT SIGNAL TO MEASURE GROUP DELAY

Francesco Carassa, Milan, Italy, assignor to Automatic Electric Laboratories, Inc., a corporation of Delaware Filed Nov. 27, 1967, Ser. No. 685,903
Int. Cl. H04b *1/04*
U.S. Cl. 325—47 2 Claims

ABSTRACT OF THE DISCLOSURE

The amount by which carrier signal modulates a pilot signal is detected to develop a direct-current output. In a first branch of a measuring circuit connected to the output of a frequentcy demodulator, pilot signal alone is filtered to provide a constant reference freqency. In a second branch, a diode passes only the positive portions of the carrier signal including the pilot signal; and in a similar third branch, a diode connected in an opposite sense passes only the negative portion. A coherent phase demodulator in each of the second and third branches receives one of the portions of only one polarity and also the reference from the first branch. The outputs of the demodulators are combined in a differential circuit and filtered to provide a direct-current voltage proportional to modulation of the pilot, and therefore proportional to amount of group delay.

BACKGROUND OF THE INVENTION

This invention pertains to apparatus for measuring group delay (phase changes with frequency) in wave transmission lines and networks, and particularly to apparatus for measuring group delay continually during transmission of signals and for developing voltage suitable for automatic control of equalization.

Commonly, group delay is measured only while a transmission line is removed from normal service. Signal from a sweep-freqency generator is applied to the idle transmission line to provide a panoramic output which is observed on a cathode ray tube. This observation aids in making equalizer adjustments manually to obtain flat frequency response. An arrangement for making equalizer adjustments automatically rather than manually is desirable. Normal service would not be interrupted; a technician would not have to be present to observe the display of frequency response and to make the adjustments; equalizers could readily be switched between different lines and be adjusted automatically as required for their new connections; and likewise automatic equalizers would adjust automatically to compensate for rapid changes while they are in use in the same lines.

An arrangement for automatically controlling group delay characteristics is shown in Hungarian Patent No. 151,357. In that arrangement, two constant carrier signals are utilized, one of the constant signals having a frequency somewhat higher than the upper frequency limit of the information signal transmission band, and the other of the constant signals having a freqency somewhat below the lower frequency limit. The amount by which the low-frequency signal modulates the high-frequency signal is proportional to the amount the frequency characteristic over the signal band departs from being flat. The low-and high-carrier signals are demodulated, filtered to remove signals having frequencies higher than the low carrier frequency, and applied to a phase detector for developing a control voltage proportional to the amount the low-frequency carrier signal modulates the high-frequency carrier signal. This control voltage is therefore proportional to the amount the transmission characteristic departs from being flat and having polarity according to whether the slope of the characteristic curve is positive or negative. The control voltage is applied to an equalizer.

SUMMARY OF THE INVENTION

The amount of modulation of a single constant carrier signal (pilot signal) by a band of main signals is measured in a new demodulator arrangement. This amount of the measured modulation of the pilot signal is proportional to the slope of the frequency characteristic of the transmission circuit; i.e., the amount the frequency characteristic departs from a desirable flat characteristic. Commonly, the required pilot signal for this measuring arrangement is already transmitted for other purposes, such as frequency control of signal generated at a remote receiving station.

In a FM (frequency-modulation) transmitting and receiving system, the demodulator arrangement or group-delay measuring circuit of this invention is connected to the output of a usual FM demodulator. The input of the measuring circuit branches into three circuits for supplying signal to two coherent phase demodulators. One of the branches has a narrow bandpass filter for supplying reference signal, having a frequency of the pilot signal, to the two coherent phase demodulators. The other two branches include diodes for separating the signal into positive and negative portions for application to the respective coherent phase demodulators. Through this arrangement, the positive and negative portions of the main signal are each multiplied by signal at the pilot frequency. The outputs of the phase demodulators, after being combined in a differential circuit, are passed through low-pass filters to obtain low-freqency components which are proptional to the amount the pilot is distorted as a result of slope in the frequency characteristic of the transmission line.

An object of this invention is to measure continually group delay of a transmission line through the use of a single pilot signal and to provide substantial direct-current control voltage suitable for application to an equalizer.

BRIEF DESCRIPTION OF THE DRAWING

The single figure shows in a block diagram the group delay measuring device of this invention connected to a conventional FM transmitting-receiving system.

DESCRIPTION OF THE PREFERRED EMBODIMENT

A conventional FM transmitting and receiving system is shown in the upper portion of the accompanying figure. An FM transmitter 1 supplies high-frequency carrier signal through a transmission medium to a remote receiver. The outputs of an information source 2 and a pilot signal oscillator 3 are connected to the modulation input of the transmitter. Commonly the information source 2 supplies a band of subcarrier signals which have been modulated by telephonic and television signals. Pilot signal oscillator 3 supplies a signal having constant amplitude at a frequency slightly higher than the highest frequency of the signal supplied by the information source 2. Signal from the FM transmitter 1 is transmitted over an antenna system or over a coaxial cable to a frequency demodulator 4 of the usual receiving system. The demodulated signals corresponding to the signals supplied by the information source 2 are applied through a pilot signal rejection filter 5 to succeeding transmission circuits.

The lower portion of the figure shows the group delay measuring arrangement of this invention. The input of the measuring circuit has three branches 6, 8, and 10 which are connected to the output of the frequency demodulator 4 for receiving signals originally derived from the information source 2 and from the pilot signal oscillator 3. In the input branch 6 of the measuring circuits positive portions of the information and the pilot signals are applied to an input of a coherent phase demodulator 7; in the branch 8, the negative portions of the signals are supplied to an input of a coherent phase demodulator 9; and in the branch 10, the pilot signal is filtered to remove substantially all frequency variations and it is supplied as a reference to the coherent phase demodulators 7 and 9.

In more detail, the output of the frequency demodulator 4 is connected at the input of branch 6 through a diode 11 to the input of an amplifier 12. The output of the amplifier 12 is connected to the input of the coherent phase demodulator 7. Likewise the output of the frequency demodulator 4 is connected for branch 8 through a diode 13 to the input of an amplifier 14, and the output of the amplifier 14 is connected to the input of the coherent phase demodulator 9. In branch 6 the diode 11 is connected in the proper sense for passing positive portions of the carrier signal; whereas in branch 8 the diode 13 is connected in an opposite sense for passing the negative portions of the carrier signals. Since the carrier signals derived from the information source 2 are much stronger than the pilot signals derived from the oscillator 3, the information signals derived from the source 2 dominate in determining whether the signal is passed by the diode 11 or by the diode 13. Effectively the diodes 11 and 13 may be considered as a switching arrangement that applies pilot signal to the coherent phase demodulator 7 when the instantaneous value of the information carrier signals is positive and applies the pilot signal to the coherent phase demodulator 9 when the instantaneous value of the information carrier signals is negative. In the branch 10, the output of the frequency demodulator 4 is connected through a bandpass filter 15 to respective reference inputs of the coherent phase demodulators 7 and 9. Outputs of the coherent phase demodulators 7 and 9 are connected to respective inputs of a differential circuit 16. As shown in equations below, since the outputs of the coherent phase demodulator 7 and 9 have opposite signs, the differential circuit 16 provides an output that is the sum of the absolute values of the outputs of the demodulators. The output of the differential circuit 16 is connected through a low pass filter 17 to direct-current output circuits. The direct-current output may be used to operate a meter, but it is most valuable for controlling an equalizer that is connected in the transmission circuit ahead of the frequency demodulator 4. The output voltage has a polarity corresponding to the sign of the slope of the frequency characteristic, and an amplitude determined by the amount of the slope.

The frequency compensating components of transmission lines are initially adjusted to provide flat frequency characteristics under usual conditions, and automatic equalization control is effective to compensate for drifts. Let $T_C$ be the group delay at a mid-frequency of a signal band that is to be corrected and the group delay characteristic of the band be represented by the series expansion:

$$F=T_C+a_1(f-f_C)+a_2(f-f_C)^2+ \dots$$

Since the drifts are usually simple changes affecting much or all of the band, the changes can be represented by the low order terms of the equation. The embodiment described herein is mostly effective on only the first two terms which are terms of the first order.

Let the input $e(t)$ to the FM transmitter 1 be:

$$(1)\quad e(t)=s(t)+E \cos \omega pt$$

where $s(t)$ is the main signal from the information source 1, and E cos $\omega pt$ is the output of the pilot signal generator 3. After the signal is transmitted over circuits that do not have absolutely flat frequency characteristics, the output $u(t)$ of the demodulator 4 is:

$$(2)\quad u(t)=s(t)+d(t)+E \cos [\omega pt+ks(t)]$$

where $d(t)$ represents distortion independent of the presence of the pilot signal (plus possibly cos $2\omega pt$ and higher harmonics), and the last addend represents distortion of the pilot signal resulting from phase modulation of the pilot signal by the main signal. Where the frequency $\omega p/2\pi$ of the pilot signal is somewhat higher than the highest frequency in the band of main signals $s(t)$, $k$ of the last addend of the Equation 2 can be shown to be:

$$(3)\quad k=a_1\omega_p F$$

where F is frequency drift or departure in phase in pilot signal for a unitary instantaneous value of the main signal $s(t)$. Therefore, the phase modulation is proportional to $k$.

Assuming that the average value of the main signal $s(t)$ is zero, the signal must be separated into positive and negative portions in order to obtain a significant direct-current output proportional to $k$. Referring to the instantaneous signals at the input of the demodulator 7 as $u_A(t)$ and that at the input of the demodulator 9 as $u_B(t)$, the output of the respective modulators is namely these respective values multiplied by sin $\omega pt$, where sin $\omega pt$ is derived from the output of the bandpass filter 15. The output of the filter 15 is preferably a square wave with a spectrum represented by approximately sin $\omega pt+\frac{1}{3}$ sin $3\omega pt+ \dots$ Because of the low-pass filter 17, only the first term is effective to produce output when multiplied by the last term of the Equation 2 above. The pilot signal is represented by this last term is obviously nearly in synchronism with the reference signal which is derived from the pilot signal itself, and produces a low-frequency or direct-current voltage in the output of the demodulators 7 and 9. Disturbances caused by the switching function of the diodes 11 and 13 and by noise superimposed on the transmitted signal also include components near the frequency of the pilot signal. The effect of these components can be substantially eliminated by low-pass filters in the outputs of the demodulators 7 and 9. The average outputs of the respective demodulators 7 and 9 can be represented as $\overline{u_A(t) \cdot \sin \omega pt}$, and $\overline{u_B(t) \cdot \sin \omega pt}$. While signal $s(t)$ is being applied through a transmission circuit that is known to have a flat frequency characteristic, the phase of the channel 10 for applying the reference signal is adjusted so that output from the low-pass filter 17 is zero.

When the instantaneous value of the output of the frequency demodulator is positive, let the average value of the signal applied to the input of the coherent phase demodulator 7 from the output of the amplifier 12 be $\overline{S_A}$; when the instantaneous value of the output is negative, let the average value of the signal applied to the input of the coherent phase demodulator 16 be $\overline{S_B}$. Since the average value of the complete signal $s(t)$ is zero, and the gains of the amplifiers 12 and 14 are equal, the average value of the signal applied to the demodulator 7 is $k\overline{S_A}$ and that value applied to the demodulator 9 is $-k\overline{S_A}$. The difference between the two values obtained at the filtered output of the differential circuit 16 is $2k\overline{S_A}$. The output from only one of the demodulators 7 or 9 might be used; but the level of the desired output would be less, and undesirable variations resulting from unavoidable small changes in the reference signal which is applied from the output of the band pass filter 15 to the demodulators 7 and 9 would be greater.

As mentioned above, the group-delay measuring device of this invention is especially suitable for use with voltage-controlled equalizers. The output of the measuring device is proportional to the slope of the frequency characteristic curve of the transmission system from which the device is receiving its input, and is also proportional to the amount of carrier signal being transmitted. The application of this control output to an equalizer causes the equalizer to change the frequency characteristics of the system as required to maintain the output control voltage at a low level. Since the output control voltage is proportional to the amount of the carrier signal which is modulating the pilot signal, more compensation is obtained when the transmission traffic in the system is heavy than that obtained when the traffic is relatively light. However, when the traffic is light, a moderate amount of group delay can be more readily tolerated because it causes less crosstalk than that caused when traffic is heavy.

I claim:

1. In a frequency-modulated transmission system having a band of information carrier signals and a constant pilot signal for frequency modulating signal transmitted to a remote frequency demodulator, a measuring circuit for measuring group delay comprising:

bandpass filtering means connected to the output of said frequency demodulator to derive a constant reference signal from said transmitted signal at the frequency of the pilot signal, first switching means also connected to the output of said frequency demodulator to obtain signal of one polarity from said transmitted signal, first multiplying means connected to the output of said switching means and to the output of said filtering means to obtain a first product by multiplying said reference signal by said signal of one polarity, and low-frequency filtering means connected to the output of said multiplying means to obtain from the low-frequency components of said first product a direct-current output voltage proportional to group delay in said system.

2. A group-delay measuring circuit as claimed in claim 1 having:

second switching means connected to the output of said frequency demodulator to obtain signal having opposite polarity from said one polarity, second multiplying means connected to the output of said second switching means and to the output of said filtering means to obtain a second product by multiplying said reference signal by said signal of opposite polarity, and subtracting means having separate inputs connected to the outputs of said multiplying means and an output connected to said low-frequency filtering means for supplying the difference of said products to said low-frequency filtering means.

References Cited

UNITED STATES PATENTS

| | | | |
|---|---|---|---|
| 2,236,134 | 3/1941 | Gloess | 333—16 XR |
| 2,284,612 | 5/1942 | Green et al. | 333—16 |
| 2,411,415 | 11/1946 | Cowley et al. | 333—16 XR |

JOHN W. CALDWELL, Primary Examiner

C. R. VONHELLENS, Assistant Examiner

U.S. Cl. X.R

325—67, 363; 333—16